Patented Jan. 15, 1924.

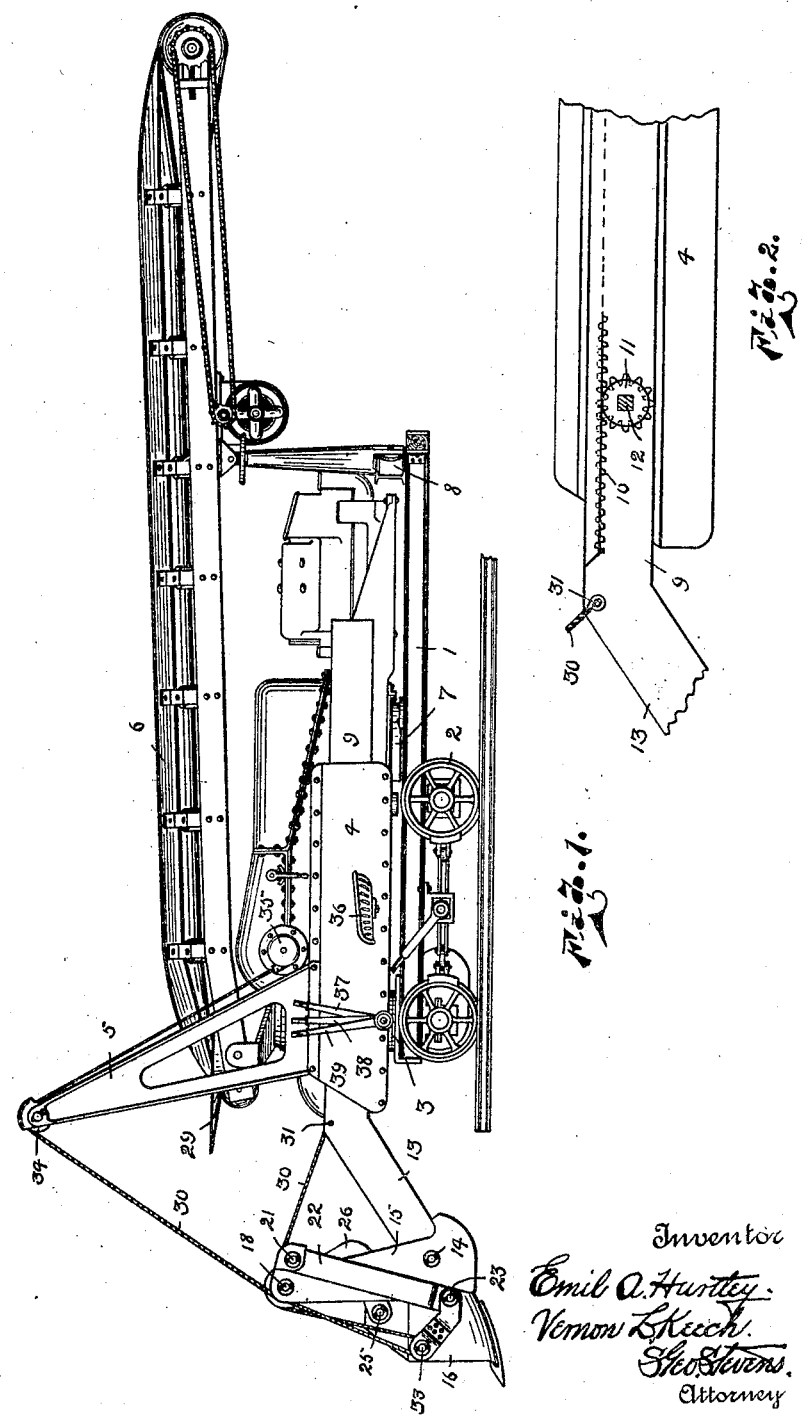

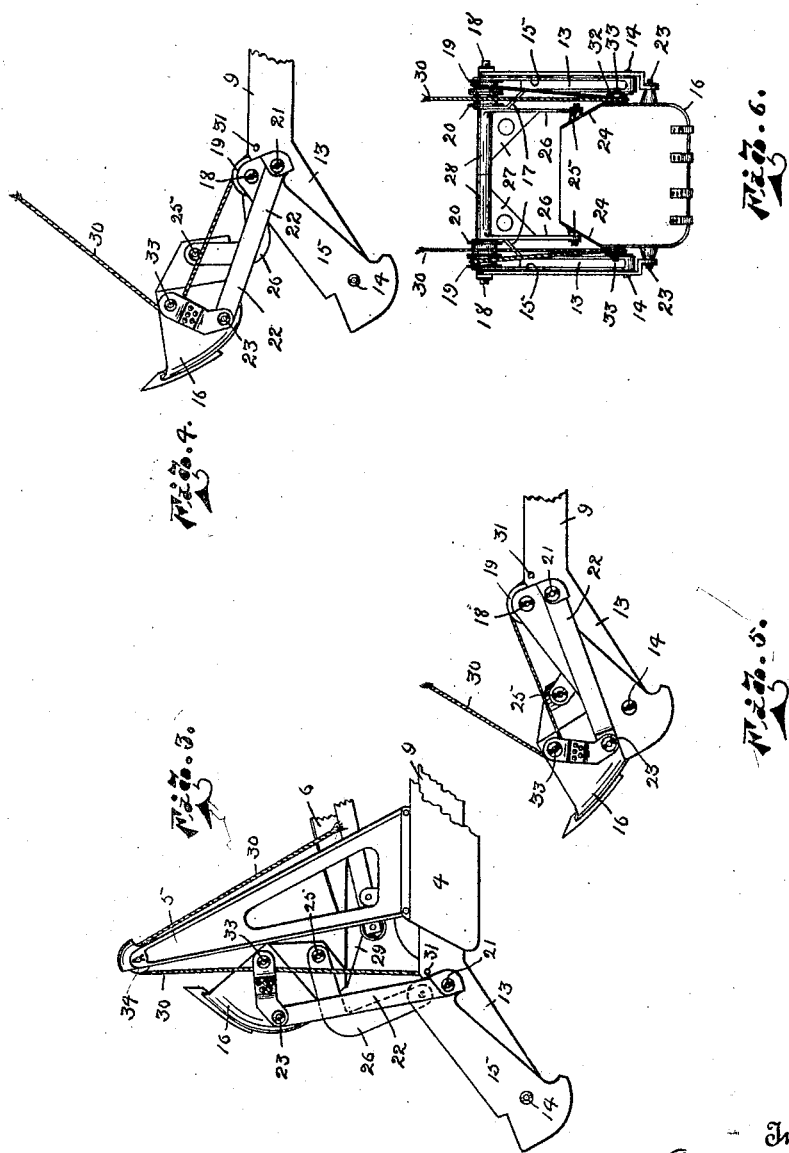

1,481,211

UNITED STATES PATENT OFFICE.

VERNON L. KEECH AND EMIL A. HURTLEY, OF DULUTH, MINNESOTA, ASSIGNORS TO ROBERT S. WALKER, OF CLEVELAND, OHIO.

MECHANICAL SHOVEL.

Application filed December 16, 1921. Serial No. 522,949.

*To all whom it may concern:*

Be it known that we, VERNON L. KEECH and EMIL A. HURTLEY, each a citizen of the United States, residing at Duluth, in the county of St. Louis and State of Minnesota, have invented certain new and useful Improvements in Mechanical Shovels, of which the following is a specification, reference being had therein to the accompanying drawing.

This invention relates to mechanical shovels and has special reference to a novel form of shoveling mechanism for portable mechanical shovels commonly used in mining operation for tunneling or the like.

The form of mechanical shovel to which our present invention applies is that in which a horizontally operated endless belt is employed for carrying the shoveled material backwardly of the shovel and depositing it into tram cars.

The principal object of the invention is to provide a more practical and efficient shoveling mechanism for such devices.

Other more specific objects and advantages will appear in the further description of the invention, among which is to produce the most human like mechanical action possible of a shovel.

Referring to the accompanying drawings forming part of this application in which like reference characters indicate like parts:

Figure 1 is a side elevation of a complete mechanical shovel embodying the invention.

Figure 2 is an inside elevation of one of the crowder arms illustrating the manner of support and operation of same.

Figure 3 is a side elevation of the shovel operating mechanism showing the shovel in dumping position.

Figure 4 is a similar view showing the shovel in its partly elevated position.

Figure 5 is a similar view showing the shovel inclined at rest upon the crowder arms, and Figure 6 is a front elevation of a shovel in the position shown in Figure 1 of the drawings.

1 represents an elongated vehicle chassis mounted upon suitable tram wheels 2 and which may be self propelled or not, as preferred. Upon the forward end of the chassis, as at 3, is pivotally mounted the shovel mechanism carriage comprising principally the side ways 4, of which there are two, the masts 5, one supported about the forward end of each way 4, and the endless conveyor 6.

The rearwardly extending portion of the carriage is mounted upon an arcuately shaped support 7 so that it may be swung about thereupon on its forward pivotal support previously described and this swinging motion of the carriage may be accomplished in any desired manner independently of a like motion of the conveyor, which latter is manually, adjustably mounted upon the arcuately shaped support 8, the same not forming any part of my present invention.

Intermediate of the ways 4 and one slidably mounted against the inside of each way, are two horizontally disposed crowder arms 9 they each having formed upon their upper inner corners a geared rack 10, each of which racks meshing with a driving pinion 11 mounted upon a transverse shaft 12 operated and controlled in any desired manner common to such mechanisms. The forward ends of the crowder arms 9 are inclined downwardly and forwardly, as at 13, and each pivotally supports on their lower extremity, as at 14, a cradle arm 15. These cradle arms are rockable upon their pivotal connections and normally stand approximately upright, that is at least when the shovel 16 is in its lowermost position.

As a preferred form of construction, the cradle arms 15 are each hollow or double so that the ends 13 of the crowder arms fit therein, and the inner walls of each of these cradle arms are offset inwardly as at 17 forming a double bearing for the horizontally disposed through shaft 18 and also a sort of bridle for the two sheaves 19 and 20 mounted upon the shaft 18 intermediate of the spaced upper ends of each cradle arm 15.

Upon the upper ends of the cradle arms and just back of the mounting of the shaft 18 are pivotally attached as at 21 the outside dipper arms 22, which normally depend downwardly and carry the dipper 16 by being pivotally connected as at 23 to the opposite lower corners thereof. The dipper 16 is generally arcuate in shape in side elevation and elongated longitudinally of the axis of the machine, the innermost rear side walls 24 converging rearwardly and having pivotally attached on the outer walls thereof as at 25 the inside dipper arm 26. These dipper arms 26 are strengthened laterally by having diagonal corner fillets

27 placed therein and which are formed integral with the elongated hub or flange sections 28, the inner ends of which abut each other establishing the predetermined spacing of the inside dipper arms 26. These dipper arms are made L-shaped, as clearly illustrated in Figure 3 of the drawings, this shape being necessary for their convenient clearance of the apron 29 of the conveyor belt 6. The dipper is thus provided with a double support and the inside arms being shorter than the outside arms will cause the dipper to assume an ideal dumping position when it is brought up above the apron 29 of the conveyor, as shown in Figure 3 of the drawings.

As a means for manipulating the dipper vertically we provide hoisting lines, one upon either side thereof, indicated at 30. These lines are each fastened at one end to its respective crowder arm, as at 31, and from thence each line passes over its respective sheave 19 down to and around a sheave 32, attached as at 33 to the uppermost side corner of the dipper, thence upwardly over the sheave 20 to and over the sheave 34 in the mast 5, there being two of such masts one upon either side of the machine as before described. From there each hoisting line leads downwardly to its winding drum, indicated at 35, and from whence it is manipulated as desired.

There are two of the winding drums 35, one serving each cable 30, but they are mounted upon the same shaft and are operated simultaneously. The manner of such operation is not considered necessary to explain as such is common to those versed in the art. However there is illustrated at 36 a seat for the operator of the machine extending from one side thereof and in front of which are mounted the three levers 37, 38 and 39, which may be arranged to suit the operator, one of them controlling the shaft on which the drums 35 are mounted, and another one the operation of the shaft 12 upon which the driving pinions 11 are mounted for operating the crowder arms either back or forth, it being understood that it is only necessary to operate mechanically the drums 35 in but one direction as the gravity of the shovel mechanism will at all times normally tend to assume the position shown in Figure 1 of the drawing for active operation.

Now having the machine properly assembled and positioned for engaging a pile or wall of material to be removed, the operation of the shovel is as follows:

By manipulation of the proper lever the crowder arms are forced forwardly until the dipper engages the material to be moved, when the same may be raised by stress upon the lines 30 which will result in a scoop like action of the dipper upon its pivotal supports 14 on the ends of the crowder arms, and this action will at all times continue as the initial orbital action of the dipper as long as stress continues upon the lines 30 regardless of the forward action of the crowder arms which may or may not be simultaneous with the raising or lowering of the dipper arcuately until the cradle arms 15 rest upon the upper inclined edges of the forward ends 13 of the crowder arms. When this position of the cradle arms is assumed, the same being clearly illustrated in Figures 3, 4 and 5 of the drawings, any further stress upon the hoisting lines 30 will cause the dipper to move arcuately upon its pivotal supports 21 and simultaneously become tipped slightly backwardly due to the shorter innermost dipper arms 26 being pivotally connected as previously described to the upper end of the cradle arms. If the hoisting stress on the lines 30 is continued, and the crowder arms withdrawn to their rearmost limit, the dipper will eventually assume the position shown in Figure 3 of the drawing, whence its contents will completely dump into the apron 29 of the endless conveyor 6.

By this form of combination pivotal support for the dipper it will be seen that almost any desired effect of the lip of the dipper engaging the material to be moved may be accomplished. For example, when the stress upon the lines 30 on the dipper after assuming the position shown in Figure 5 is continued, the lip of the dipper will be moved slightly forwardly and tend to assume a more vertical action than it would were it not for the double pivotal connection of the inner and outer dipper arms, and it is quite obvious that this action may be lessened or increased by the simultaneous action of the crowder arms, and that by rapid short motions of either or both of these operating elements the lip of the dipper may be most delicately or forcibly applied to its work in the manipulating of a load thereupon for the best results possible.

While it is evident that the various motions possible with this combination are practically indescribable, stress may be put upon this one in particular; that, when the dipper is in the position shown in either Figures 1 or 5 of the drawing with the lip thereof engaging say a mixed mass of large and small stones for example into which it may be comparatively hard to thrust the dipper by direct forward motion, a short reciprocal motion of the crowder arms back and forth will cause the lip of the dipper to raise and lower in a forwardly and upwardly inclined path. Or when the dipper is in the position shown in Figure 1, and the hoisting lines only are operated, the lip of the dipper will instantly travel in an arcuately shaped path only about the pivotal point 14 of the cradle arms, that is until the latter assumes their position of rest, as in Figure 5, when the travel of the dipper will be changed to that of substantially vertical for a short distance before coming to its dumping position. Thus it becomes possible to literally work itself by almost any desired motion into the material to be engaged.

While we have shown the most practical embodiment of the invention, and which is now in practical operation, it is to be understood that various modifications of the specific combination may be resorted to without departing from the spirit of the invention.

Having thus described our invention, what we claim and desire to secure by Letters Patent, is:

1. The combination with a mechanical shovel having means for conveying the material being shoveled longitudinally thereof, and horizontally reciprocal crowder arms, of a dipper pivotally mounted upon the forward end of the crowder arms, means for operating the dipper independently of the crowder arms and discharging the contents thereof on said conveying means, and means whereby reciprocal motion of the crowder arms will operate the lip of the dipper substantially vertically.

2. The combination with a mechanical shovel having dipper carrying arms, horizontally reciprocal only, of a pivotal support upon said arms for the dipper, means for operating the dipper pivotally upon the support simultaneously with the pivotal operation of the latter, either with or independently of the action of the dipper carrying arms.

3. The combination with a mechanical shovel having horizontally reciprocal dipper carrying arms, of means pivotally mounted upon the arms for supporting the dipper, arms pivotally supporting the dipper upon said last mentioned means, and flexible means directly engaging and operating the dipper.

4. A dipper for a mechanical shovel comprising in combination a suitable horizontally reciprocal support, cradle arms pivotally mounted upon the support, dipper carrying arms pivotally mounted upon the free ends of the cradle arms, flexible means for operating the dipper vertically either independently of or with the horizontal action of the support, substantially as and for the purpose described.

5. The combination with a dipper for mechanical shovels of the character described, of a support for said dipper comprising horizontally reciprocable crowder arms, upwardly extending cradle arms pivotally mounted upon the forward ends of the crowder arms, dipper carrying arms pivotally mounted upon the upper ends of the cradle arms, and a hoisting line attached at one end to the crowder arms and cooperatively connected with the dipper and means whereby the latter may be operated either by the line or the crowder arms or both.

6. The combination with a dipper for mechanical shovels of the class described, of a support for said dipper comprising horizontally reciprocable crowder arms having forwardly and downwardly inclined dipper supporting ends, cradle arms pivotally mounted upon the lowermost extremity of said inclined ends of the crowder arms, dipper carrying arms pivotally mounted upon the free ends of the cradle arms, a dipper pivotally supported by said arms and means for hoisting said dipper whereby during the initial action of said hoisting means the cradle arms will assume a position of rest upon the inclined ends of the crowder arms and the dipper continue its travel to the position of discharge independently of the action of the cradle arms.

7. The combination with a dipper for mechanical shovels of the character described, of operating mechanism therefor comprising horizontally reciprocable crowder arms, cradle arms and dipper arms pivotally and cooperatively mounted intermediate of the dipper and the crowder arms and supporting the dipper, and flexible dipper hoisting means engaging and acting upon the dipper, and the crowder, cradle and dipper arms, substantially as described.

8. The combination with a dipper for mechanical shovels of the character described, of operating mechanism therefor comprising horizontally reciprocable crowder arms, cradle arms, and dipper arms pivotally and cooperatively mounted intermediate of the dipper and the crowder arms and supporting the dipper, and hoisting lines permanently attached at their lower ends to the crowder arms, and cooperatively engaging the cradle and dipper arms and dipper, substantially as described.

In testimony whereof we hereunto affix our signatures in the presence of two witnesses.

VERNON L. KEECH.
EMIL A. HURTLEY.

Witnesses:
S. C. BRONSON,
S. GEO. STEVENS.